United States Patent

Ehluss et al.

[15] 3,659,503
[45] May 2, 1972

[54] HYDRAULIC ROTARY-BLADE PIVOT DRIVE FOR HYDRO-STABILIZERS AND RUDDER SYSTEMS

[72] Inventors: Heinz-Günter Ehluss, Tornesch; Erich Wessel, Hamburg, both of Germany

[73] Assignee: Howaldtswerke-Deutsche Werft Aktiengesellschaft Hamburg und Keil, Hamburg, Germany

[22] Filed: May 8, 1970

[21] Appl. No.: 35,709

[30] Foreign Application Priority Data

July 4, 1969 Germany.....................P 19 33 963.0

[52] U.S. Cl............................92/125, 418/120, 418/123, 418/124, 277/85
[51] Int. Cl........................................F01c 9/00, F16j 15/38
[58] Field of Search....................92/125, 124; 418/114, 120, 418/124, 268, 119, 122, 123, 266, 267, 136, 266; 277/84, 85, 140, 146

[56] References Cited

UNITED STATES PATENTS

| | | | |
|---|---|---|---|
| 2,966,144 | 12/1960 | Self | 92/125 |
| 2,466,389 | 4/1949 | Davis | 92/124 |
| 3,277,796 | 10/1966 | Wessel et al. | 92/125 |
| 3,053,236 | 9/1962 | Self et al. | 92/125 |
| 2,960,076 | 11/1960 | Henry | 92/125 |

Primary Examiner—Martin P. Schwadron
Assistant Examiner—A. M. Zupcic
Attorney—Markva, Smith & Kruger

[57] ABSTRACT

A hydraulic rotary-blade pivot drive for hydro-stabilizers and rudder systems, particularly on ships, with receiving grooves on the external sides of the rotor blades and/or the inside of the stator blades, and with sealing strips and elastic elements which are radially displaceable in said receiving grooves. Slave blades are provided between the sealing strips and the elastic elements over the entire length of the rotor. The slave blades are held in the receiving grooves with clearance so as to be radially displaceable and project beyond the outsides of the rotor blades and the insides of the stator blades and are designed to ensure hermeticity on all sides. The sealing strips together with the slave blades and the elastic element form one single sealing unit.

4 Claims, 6 Drawing Figures

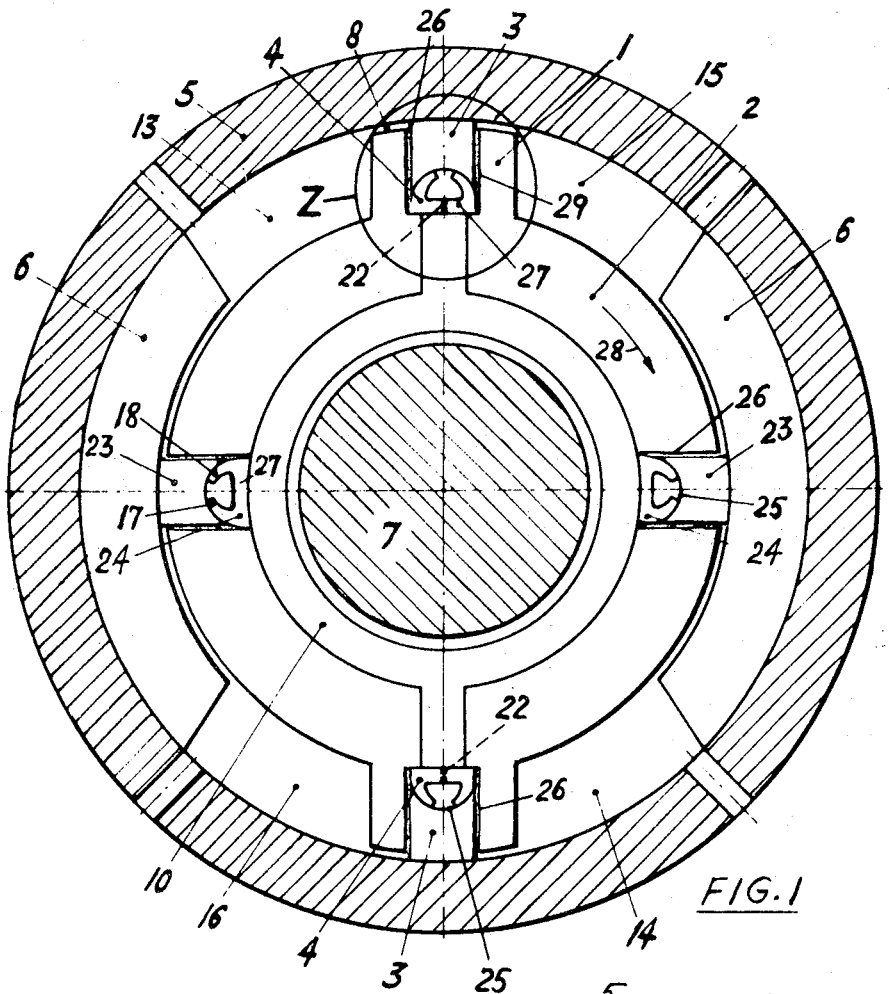
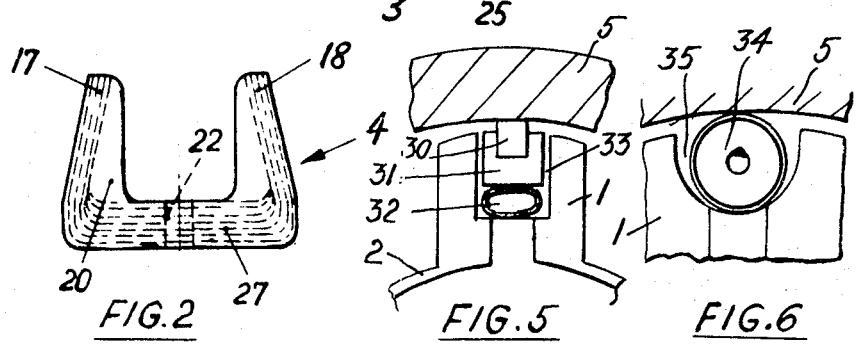

Patented May 2, 1972

INVENTORS:
HEINZ-GÜNTER EHLUSS
ERICH WESSEL

BY
Lowry, Rinehart, Madva & Smith
ATTORNEYS

HYDRAULIC ROTARY-BLADE PIVOT DRIVE FOR HYDRO-STABILIZERS AND RUDDER SYSTEMS

BACKGROUND OF THE INVENTION

This invention relates to a hydraulic rotary-blade pivot drive for hydro-stabilizers and rudder systems, particularly on ships, with receiving grooves on the external sides of the rotor blades and/or the insides of the stator blades, and with sealing strips and elastic elements which are radially displaceable in the grooves.

Systems are known in which, in a rotary-blade motor for rudder installations, the torque is transmitted to the body of the vessel via devices which compensate positional inaccuracies, preferably non-rotating couplings or elastic elements (cf. German Patent specification No. 893,311).

As regards drives for hydro-stabilizers, systems are known (cf. German Patent specification No. 1,195,189) in which the outer part of the rotary-blade drive is connected with the stabilizing surface via transversally elastic coupling members.

A hydraulic rudder system is also known (cf. German Patent specification No. 899,178) in which the narrow sides of the blades are provided with grooves in which sealing bars are inserted, elastic sealing rings being intercalated. In these cases one sealing bar is placed on the upper surface and another on the lower surface of the blade, while two sealing bars, offset in relation to the upper and lower bars, are provided on the side surfaces.

In the known pivot drives, elastic coupling elements and suspensions are required. When the housing suffers deformations due to high pressures, the rotor is liable to scrape against its wall. The separate components of the pivot drive must be manufactured to very narrow tolerances.

SUMMARY OF THE INVENTION

It is the object of the invention to provide a hydraulic rotary-blade pivot drive for hydro-stabilizers and rudder systems with a radially and axially displaceable rotor operating without elastic intermediate elements.

To attain this object the present invention provides a hydraulic rotary-blade pivot drive for hydro-stabilizers and rudder systems wherein slave blades are provided between the sealing strips and the elastic elements over the entire length of the rotor, said slave blades being held in the receiving grooves with clearance so as to be radially displaceable and projecting beyond the outsides of the rotor blades and the insides of the stator blades and being designed to ensure hermeticity on all sides, said sealing strips together with said slave blades and said elastic elements facing one single sealing unit.

The blade rotor is thus rendered radially and axially displaceable and also tiltable, for which purpose, in addition to sealing masks (axial sealing), the slave blades are provided with soft rubber sealing rings of the same fitted length, placed beneath them and having a hard wear-resisting casing, and are used as radial sealings, positioned in the receiving grooves of the blade.

The spaces of the sealing rings, which are subjected to a certain initial stress when being inserted, are made wide enough to ensure that they are caused by the changes in the operating pressure to move onto one side or the other of the groove in the blade, thus opening those inlets to the oil chambers of the mask supports through which a flow is required according to the side on which pressure is prevailing at the time.

In the event of an intensive supply of pressure oil to the rotor or to the blades, the movable sealing unit comprises a control tongue assembly of U-shaped profile and a slave blade having a semicircular cavity in one of its ends, and the control tongue assembly rests by its web on the base of the groove, while that end of the slave blade which is provided with the semicircular cavity is directed towards said base, the control tongues of the control tongue assembly elastically resiliently fitting into said semicircular cavity, that end of the slave blade which is further away from the base of the groove resting against the internal surface of the rotor housing and against the stator blade or the rotor hub.

In a further development of the invention the control tongue assemblies of U-shaped profile possess a flexurally rigid web onto which the tongues are shaped substantially at right angles, the said tongues being provided with internal linings of soft rubber and being flexible as regards their distance from each other and possessing spring-back resilience.

To ensure an axial sealing effect the web of the control tongue assembly is also provided with holes through which cavities of mask supports used as means for sealing the rotor in the axial direction, can be fed independently of the changes taking place in the direction of rotation.

BRIEF DESCRIPTION OF THE DRAWINGS

Several embodiments of the invention will now be described by way of example and with reference to the accompanying drawings, in which:

FIG. 1 is a plan view, partly in section, of a pivot drive according to the invention;

FIG. 2 is an end view of a control tongue assembly before being prestressed;

FIG. 5 is a view similar to FIG. 3 of a sealing unit according to a second embodiment, and FIG. 6 is a similar view of simplified sealing unit according to a third embodiment, comprising an elastic roller.

DESCRIPTION OF THE PREFERRED EMBODIMENTS

Figure 3:
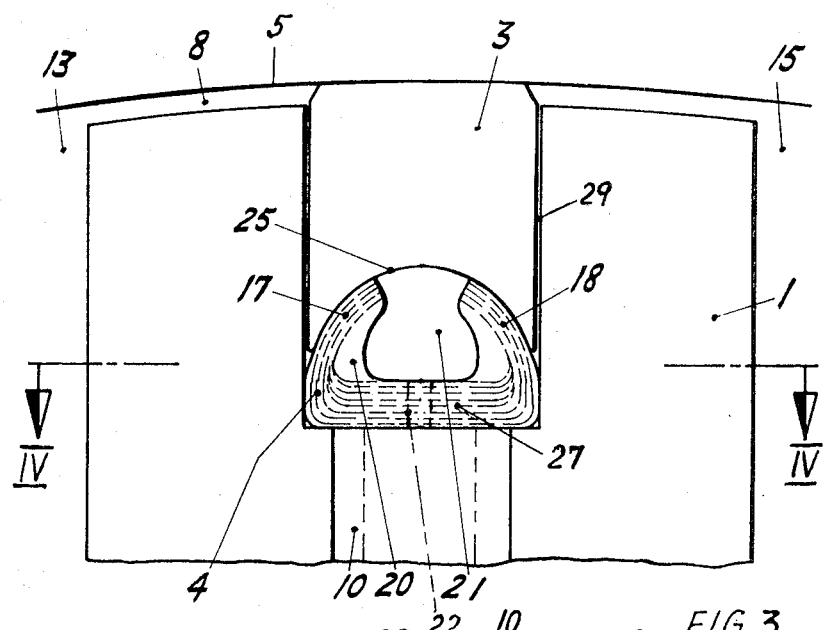
FIG. 3 shows a detail marked Z of FIG. 1, on an enlarged scale.

FIGS. 1 to 4 show a pivot drive according to the invention which consists of a housing 5 of circular cross section, normally closed by a cover not shown in the drawings. The pivoting range is defined by two diametrically opposed stator blades 6 which are rigidly connected to the internal periphery of the housing 5, and by a rotor 2 which is including its blades 1 rotatably mounted between said stator blades 6. The rotor 2 is affixed to a shaft 7 that is to be driven. In the blades 1 and in the rotor 2, receiving grooves 26, situated opposite one another in pairs, extend over the entire length of the rotor, parallel to the axis of the latter, a radially movable sealing unit being inserted in each of said grooves. Each of said sealing units consists of a slave blade 3 respectively 23 of plastics material or metal hollowed out towards the base of the groove to form a semicircular cavity 25, and of a U-shaped control tongue assembly 4 respectively 24 which rests by its web on the base of the groove and of which the tongues 17 and 18 fit into the semicircular cavity 25. The slave blades 3 and 23 and the control tongue assemblies 4 and 24 fit in accurately in accordance with the width of the working chambers or of the blades 6. The control tongue assemblies 4 and 24 have a strong rubber fabric web 27 which is provided with holes 22 and rests on the base of the groove 26. The two vertical tongues 17 and 18 are formed integral with the web 27 so as to extend initially vertically therefrom, producing a kind of U-profile, and are rendered flexible in the direction towards each other by means of an internal lining 20 of soft rubber which possesses spring-back resilience and is capable of bending inwards in alternation, in accordance with the side on which the oil pressure occurs.

The rotor shaft 7 with the rotor 2 is displaceable in a radial direction in the housing 5, in accordance with the width of a gap 8.

Figure 4:
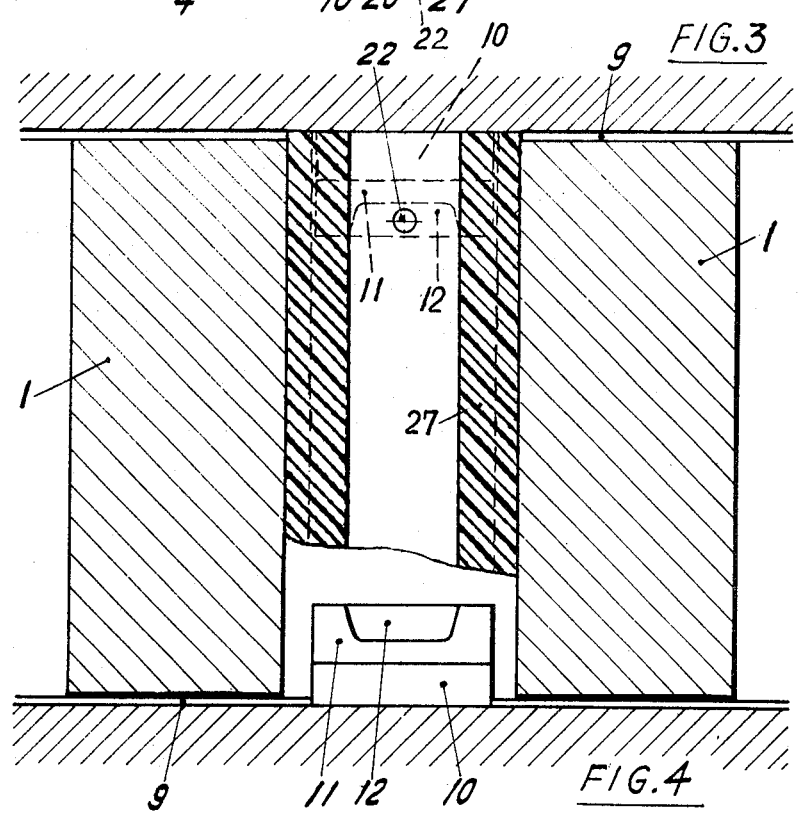
FIG. 4 is a section on the line IV—IV of FIG. 3.

The axial displaceability of the rotor 2 is indicated by gaps 9 shown in FIG. 4. The flexible bridging of the gaps 9 is effected by a metal mask 10 and a mask support 11. The mask support 11 is made of rubber and has a U-shaped profile resulting in a cavity 12 situated under the entire mask.

If, for example, the chambers 13 and 14 are fed with pressure oil, the working chambers 15 and 16 being connected with the oil return conduit, the rotor 2 rotates in the direction indicated by the arrow 28 as far as it contacts the stator blades 6. In this process the pressure oil, via the gap 8, moves past the side of the slave blade 3 which comes to rest against the opposite wall 29 of the groove 26, and reaches the control tongue assembly 4. The tongue 17 (FIG. 3) is bent slightly inwards, in opposition to the deformation resistance of the internal lining 20 of soft rubber, as a result of which the pressure is propagated into the oil-filled chamber 21 and also, via the holes 22, into the cavity 12, the internal cavities of the mask supports 11, which are used as devices for sealing the rotor 2 in the axial direction, can thus be supplied with operating pressure, regardless of the change taking place in the direction of rotation. During this time the tongue 18 seals off the working chamber 15.

When the rotor 2 rotates in the opposite direction the pressure in the working chamber 15 is maintained by means of the control tongue 18. The slave blade 23 and the control tongue assemblies 24 operate on the principles already described.

The only difference is that the control tongue assembly 24 does not require holes 22, because in this case there are no inlets into the cavities 12 of the mask.

The slave blades 3 and 23 follow up under the effect of the prestressing of the tongues 17, 18 and particularly under that of the oil pressure in the oil-filled chamber 21, on the rotation of the housing surface and of the housing blade contact surface. Radial displacements of the rotor 2 are continuously bridged by the control tongue assemblies 4 and 24, towards the masks 10, and only manifest themselves in a greater or smaller degree of curvature in the control tongues 17 and 18, which then perform slight relative sliding movements in relation to the cavity 25 of the slave blades.

The advantages of a sealing system consisting of slave blades and control tongue assembly are due in particular to the possibility thereby provided, in the case of a hydraulic rotating pivot drive system, of ensuring considerable radial rotor displacements accompanied by high operating pressures and a good sealing effect, a combination representing a property usable for a variety of purposes. An advantage offered by this system from the point of view of manufacture resides in the fact that the parts of these specially profiled slave blades and of the sealing system consisting of control tongue assemblies can be produced in a simple manner from prefabricated material in bar form, by cutting it to the required lengths, which are then fitted into the apparatus.

In the case of moderated pressures sealing units as shown in FIGS. 5 and 6 can be used. In the embodiment shown in FIG. 5 the sealing means consist of a sealing strip 30, a slave blade 31 and an elastic element 32. The slave blade 31 has lateral clearance in a groove 33, so that it can be displaced from the pressure side to the pressureless side as required.

In the embodiment shown in FIG. 6, elastic rollers 34 are arranged in semicircular grooves 35 to form a sealing unit.

The invention may be embodied in other specific forms without departing from the spirit or essential characteristics thereof. The present embodiments are therefore to be considered in all respects as illustrative and not restrictive.

What is claimed is:

1. A hydraulic rotary-blade pivot drive for hydro-stabilizers and rudder systems, particularly on ships comprising
    a. a stator having a cylindrical internal surface,
    b. a rotor mounted in said stator and having a cylindrical external surface,
    c. a plurality of receiving grooves in at least one of said surfaces and extending along the length thereof, and
    d. a sealing unit in each of said grooves comprising a longitudinally extending slave blade mounted in each of said grooves for radial displacement and projecting beyond the surface in which each groove is located, and elastic means positioned in said receiving groove between said slave blade and the base of said groove,
    e. said slave blade including a semi-circular cavity adjacent said elastic means, and
    f. said elastic means being radially displaceable in said receiving groove to press said slave blade against the surface opposite the surface in which said groove is located, and comprising an elongated resilient member having a generally U-shaped profile with a central web portion and control tongues extending transversely from opposite sides of said web portion, the web portion resting against the base of said groove and said control tongues elastically resiliently fitting into the semi-circular cavity of said slave blade whereby a chamber is formed defined by said resilient member and said semi-circular cavity in said slave blade.

2. A rotary-blade pivot drive in accordance with claim 1, wherein said web portion is flexurally rigid and said tongues extend therefrom at substantially right angles with respect to said web portion, the sides of said tongues facing each other being provided with internal linings of soft rubber whereby said tongues are resiliently flexible towards each other.

3. A rotary-blade pivot drive in accordance with claim 1, further comprising mask supports for sealing the rotor in the axial direction, said mask supports including a cavity therebetween, the web portion of each control tongue being provided with at least one hole whereby said chamber communicates with said cavity.

4. A rotary-blade pivot drive in accordance with claim 1 wherein said slave blade comprises resilient sealing means positioned against the surface opposite the surface in which said groove is located.

* * * * *